United States Patent [19]

Fisher

[11] Patent Number: 5,526,018
[45] Date of Patent: Jun. 11, 1996

[54] STRETCHING SCALES FOR COMPUTER DOCUMENTS OR DRAWINGS

[75] Inventor: Alan S. Fisher, Fremont, Calif.

[73] Assignee: Foundation Microsystems, Inc., Fremont, Calif.

[21] Appl. No.: 955,983

[22] Filed: Oct. 2, 1992

[51] Int. Cl.$^6$ .................................................. G09G 5/00
[52] U.S. Cl. ............................................ 345/127; 345/145
[58] Field of Search .................................. 340/709, 731, 340/706, 724, 723, 721, 747; 345/113, 114, 115, 116, 127, 128, 129, 130, 131, 141, 118, 121, 123, 145; 395/156, 157, 159

[56] References Cited

U.S. PATENT DOCUMENTS

| | | | |
|---|---|---|---|
| 4,190,835 | 2/1980 | Buynak | 345/141 |
| 4,686,522 | 8/1987 | Hernandez et al. | 340/709 |
| 4,728,945 | 3/1988 | Kojima | 340/709 |
| 4,745,405 | 5/1988 | Himelstein et al. | 340/709 |
| 4,891,770 | 1/1990 | Hollett | 340/731 |
| 5,146,555 | 9/1992 | Kiyohara | 345/113 |
| 5,202,671 | 4/1993 | Aranda et al. | 340/724 |
| 5,303,144 | 4/1994 | Kawashima et al. | 364/401 |

FOREIGN PATENT DOCUMENTS

| 4110999 | 4/1992 | Japan | 345/123 |
|---|---|---|---|

*Primary Examiner*—Richard Hjerpe
*Assistant Examiner*—Xiao M. Wu
*Attorney, Agent, or Firm*—Crosby, Heafey, Roach & May

[57] ABSTRACT

Visible data displayed by a computer program on a computer screen can be stretched easily by a variable amount. This system allows a scale or ruler device on the screen to be stretched vertically or horizontally, as appropriate, by use of a pointing device such as a mouse or light pen. As the scale or ruler is stretched, its display is continually updated by the computer program to show its new position as a result of the stretched. This gives the program's user a precise visual indication of how much additional stretching is required to complete the desired amount of stretching. Upon terminating the stretching operation, the computer program's data is recalculated and appropriate data displayed relative to the scale or ruler's final position.

12 Claims, 3 Drawing Sheets

STRETCHING SCALES FOR COMPUTER DOCUMENTS OR DRAWINGS

FIELD OF THE INVENTION

This invention relates to viewing and stretching data displayed on computer program visual displays, particularly with stretching displayed data in a precise manner in a document or drawing.

BACKGROUND

In a computer program which has a visual end-user interface, it is common practice to have various facilities for allowing the program's end-user to enlarge or shrink a portion of the data being displayed so that it appears larger or smaller. This action is frequently termed "zooming in" and "zooming out".

A common example of this is a drawing being displayed and edited in a computer-aided drawing program. The user may instruct the computer program to zoom in so that a portion of the drawing is enlarged and displayed in finer detail. This is useful when precise editing of the drawing is required.

In the prior art, there are two principal methods for enlarging or shrinking the data displayed by the computer program: (1) by selecting a "zoom in" or "zoom out" command, and (2) by highlighting a region of the displayed data on the computer screen and then instructing the computer to enlarge the selected portion to fill the entire screen. Each of these methods is described below.

In the first of these methods, a user generally selects a zoom in or zoom out command either by pressing a keystroke or keystroke combination which is received and interpreted by the computer program as a command to zoom. Alternatively, the user may use a pointing device, such as a mouse, track ball, digitizing tablet, touch screen or light pen to select a command from a menu, as is commonly done in computer application programs written for the Microsoft Windows operating system on the IBM PC or on Apple Macintosh systems. The amount zoomed may be preset by the program, such as "25%, 50%, 100%, and 200%". Or the user may, after selecting the zoom in or zoom out command, be prompted to specify the amount of zooming desired.

One major problem with this method of stretching displayed data is that control may be very imprecise, as in the case where stretching is accommodated in 25% gradations. Even if the user is allowed to specify the exact percentage of stretching, the user must iteratively specify the stretching/zooming amount and then observe the displayed result to see if it is what he desires. Obtaining the desired result may require several iterations.

A second problem with specifying a stretching amount is related to the aspect ratio of the displayed data. The end-user may want to stretch more in one dimension than the other. For example, the end-user may want to horizontally stretch the displayed data but not stretch the displayed data in the vertical dimension at all. Systems where a stretching/zooming percentage is selected almost always maintain the current aspect ratio of the displayed data.

In the second of the above methods for enlarging or shrinking displayed data, a pointing device is used to select or highlight a region of the computer display to enlarge. Donahue, U.S. Pat. No. 5,014,222, teaches one such method for selecting diagonally opposite corners of the area to be enlarged. After selecting the area to enlarge, the user issues a zoom command, either by a keystroke combination or by using a pointing device. The selected area is then enlarged or shrunk to fill the application program's allocated display area.

Both of the aforementioned methods stretch displayed data in both the vertical and horizontal dimensions at the same time. A problem arises with this operation in certain applications, however, because it may be desirable to stretch the displayed data in only one direction, that is to say without seeking to maintain the display aspect ratio. An example of such an application is a project scheduling computer program that displays a time scale at the top of the screen. Individual project tasks are displayed in various positions below the time scale. Their position relative to the markings on the time scale indicate the beginning and ending times of each individual task.

In a project scheduling computer program, it may be desirable to stretch the time scale and the associated tasks aligned with the time scale such that horizontal space allocated to each unit of time on the time scale is larger or smaller. Increasing the width of each time scale unit widens the space for each the tasks displayed underneath the time scale, allowing for more descriptive text to be displayed within the boundaries of each task displayed on the computer screen. Conversely, the end-user may wish to reduce the width of each time scale unit in order that more time units are visible on the display screen, displaying more project tasks.

A second example is a data charting application that displays data relative to an X–Y coordinate axis system. In such an application program, the user may want to stretch or collapse the amount of space allocated to each unit on a particular axis in order to highlight a particular trend in the displayed data. For example, the slope of a plotted line may be accentuated by reducing the amount of space allocated to each X-axis unit, thereby making the line to appear to rise or fall faster.

The present invention overcomes these drawbacks of the prior art by providing a method wherein the scale itself is stretched by using a pointing device and the displayed data is stretched accordingly.

SUMMARY OF THE INVENTION

A method is disclosed for easily stretching visible data displayed by a computer program on a computer screen by a variable amount. This system allows a scale or ruler device on the screen to be stretched by use of a pointing device such as a mouse, light pen, or track ball. As the scale or ruler is stretched, its display is continually updated by the computer program to show its new position as a result of the stretching. This gives the program's end-user a precise visual indication of how much additional stretching is required to complete the desired amount of stretching. Visible data other than the scale or ruler need not be displayed during stretching, allowing very rapid updating of the stretched scale and facilitating more rapid stretching of the overall document or drawing. Upon terminating the stretching operation, the computer program's data is recalculated and appropriate data brought into view relative to the scale or ruler's final position.

While stretching the scale, the program need not actually update the document or data that is displayed with respect to the scale in order to reflect the current stretching factor. Rather, the program could wait until the stretching operation was completed, and then update the screen to reflect the current state of the stretched scale and the aligned data displayed underneath or adjacent to the scale.

DETAILED DESCRIPTION OF THE INVENTION

In the present invention, a portion of data of interest is displayed on a computer screen. A scale or other position indicator such as a ruler is provided to show which portion of the data is displayed. The display might include grid lines or other means to facilitate the correlation of a position in the data with a position on the scale. The scale may be a visual device with demarcations designating units of the scale. The end-user uses a pointing device such as a mouse, light pen, track ball, digitizing tablet or touch screen to "grab" the scale and stretch it in the direction of the primary scale axis by moving the pointing device until the scale has been stretched by the desired amount. In essence, the scale itself becomes "elastic." This description refers generally to stretching but the same principles apply equally to shrinking the scale to display more data, generally in less detail. The descriptions below generally refer to horizontal stretching of a scale but the principles apply equally well to control and stretching in a vertical dimension.

Typically, a user moves a mouse to place a cursor within a visually displayed scale. Depressing the mouse button, the cursor can be moved in a desired direction, activating the stretching operation until the ruler or scale has stretched by the desired amount. The user releases the mouse button to terminate the stretching operation.

While stretching the scale, the program need not actually update the document or data that is displayed with respect to the scale in order to reflect the current position. Rather, the program could wait until the scale was stretched by the desired amount and then update the screen to reflect the portion of the document or drawing being viewed which corresponds to the scale position. The rate at which the display is updated depends on the available hardware. If a high-speed display is available, then the data can be displayed frequently. For most computers and computer programs, an end-user can stretch a document or drawing much faster than the computer can display it. In a preferred implementation, the document or data display is updated much less frequently than the scale is updated.

Figure 1:
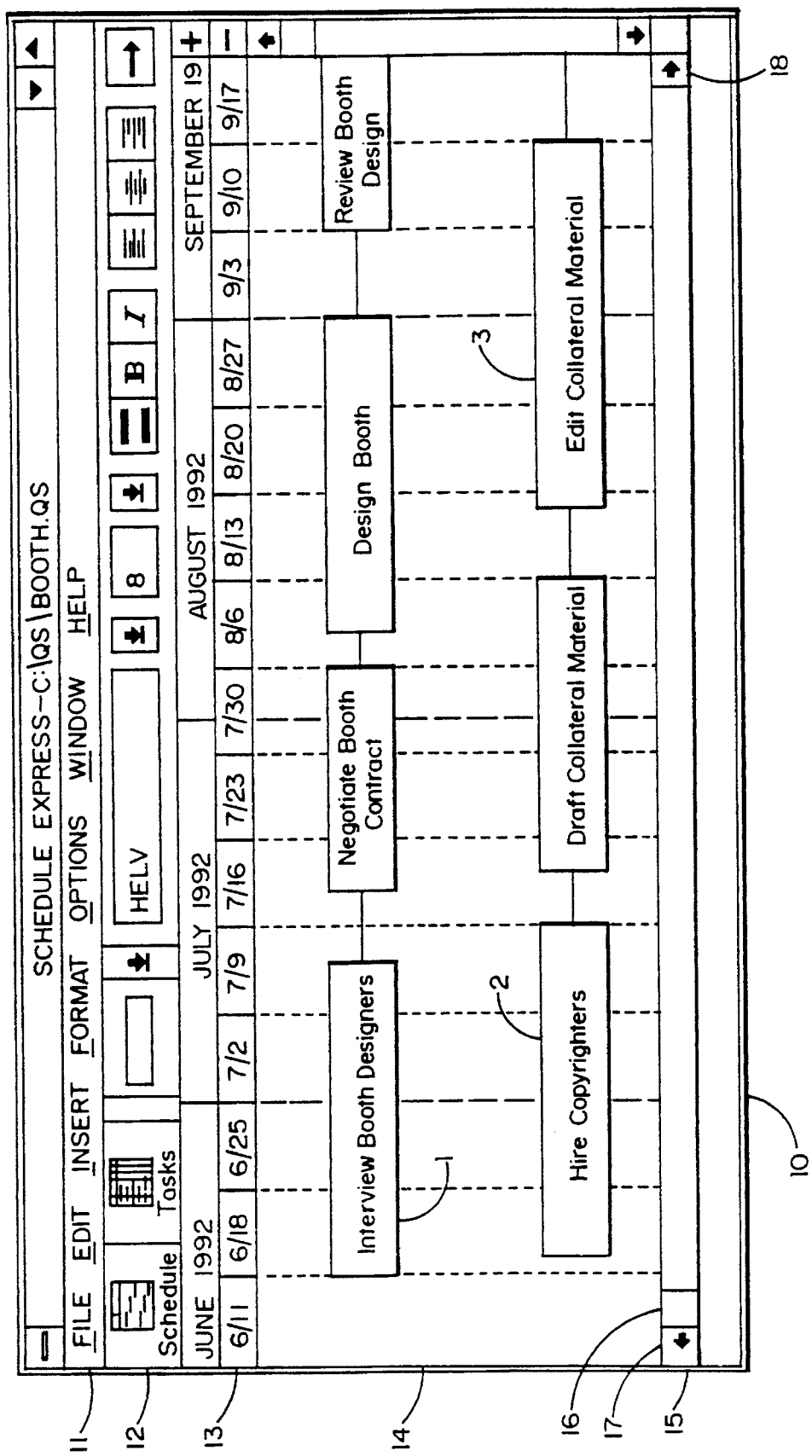
FIG. 1 illustrates a project schedule featuring a time scale at the top.

The present invention would typically be practiced in a computer program like a drawing program, word processing program, or project scheduling program as shown in FIG. 1. Such programs usually have a scale with demarcations designating units of the scale such as a ruler demarcated in inches or centimeters, or a time scale demarcated in minutes, hours, days, weeks, months, quarters, or years. The scale is usually divided into units of time or distance. For convenience, a scale, ruler, time scale or other measuring indication will be referred to herein simply as a scale. Data, such as a text document, chart, data, table or project schedule is displayed beneath or adjacent to the scale with the scale indicating the precise position of the displayed data.

Figure 2:
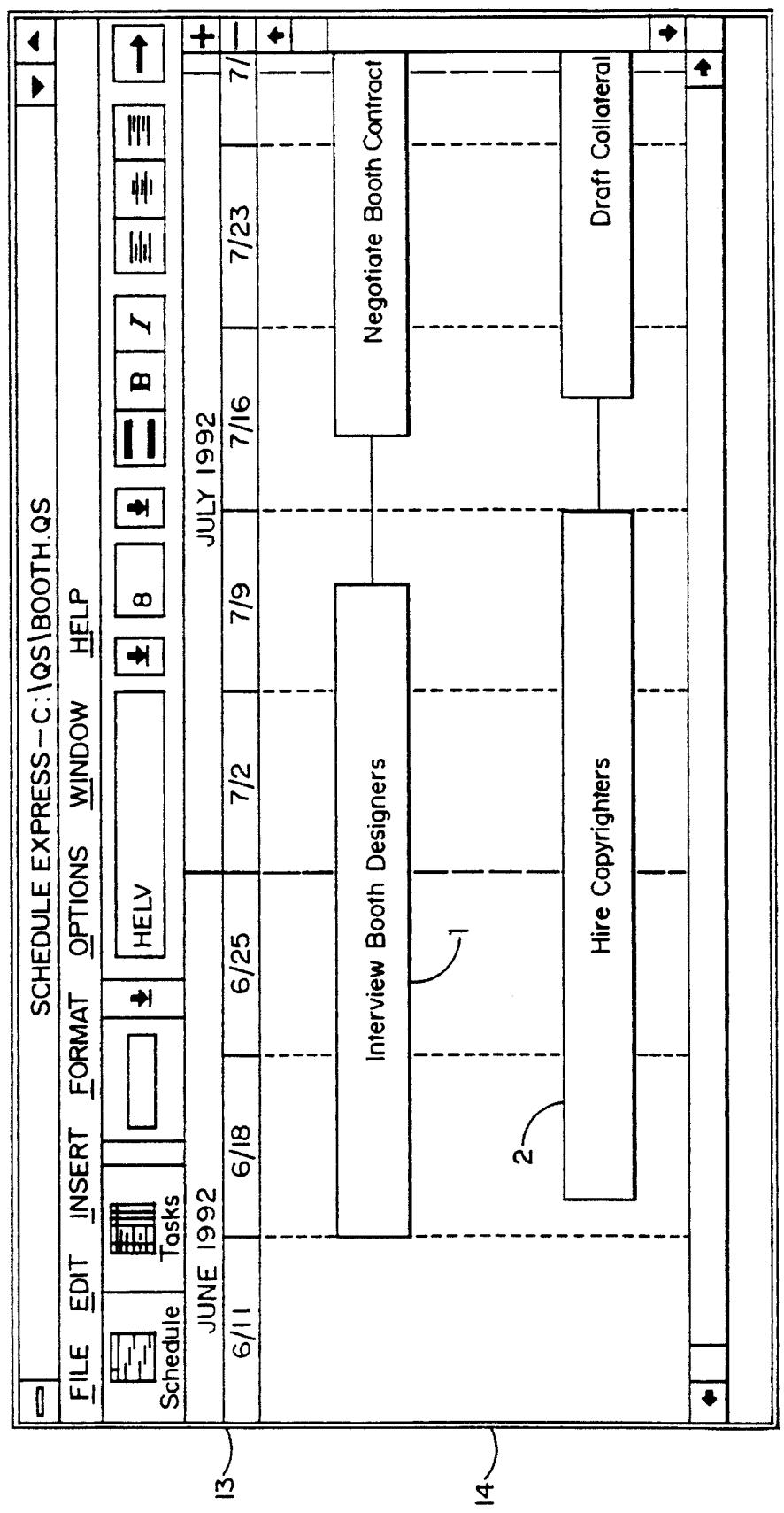
FIG. 2 depicts the same project scheduling computer program after stretching the time scale.

The need arises frequently to conveniently, precisely, and quickly stretch the displayed data in the direction of the principal scale axis. Referring to FIG. 1, the display of a typical program may include window 10 with menu bar 11, button bar 12, scale 13, data display 14, and scroll bar 15, with elevator 16, left scroll control 17, and right scroll control 18. Tasks 1, 2, and 3 are displayed in data display 14. In the project scheduling program illustrated in FIG. 1, the end-user may want to stretch the project plan horizontally in order to elongate the displayed tasks for the purpose of allowing more text to be displayed within the task bars. Referring to FIG. 2, scale 13 and data display 14 and elevator 16 have been updated to show a new portion of the data. Tasks 1 and 2 are much larger. This makes small objects larger, hence more visible, and allows more room for text contained in the box for the task. Note, for example, that in FIG. 1 the text in task 1 nearly fills the box but in FIG. 2 the text in task 1 fills only about one half of one line. The remaining portions of the window are not changed. Note that the time scale displays are different as are the project tasks displayed below their respective time scales.

Figure 3:
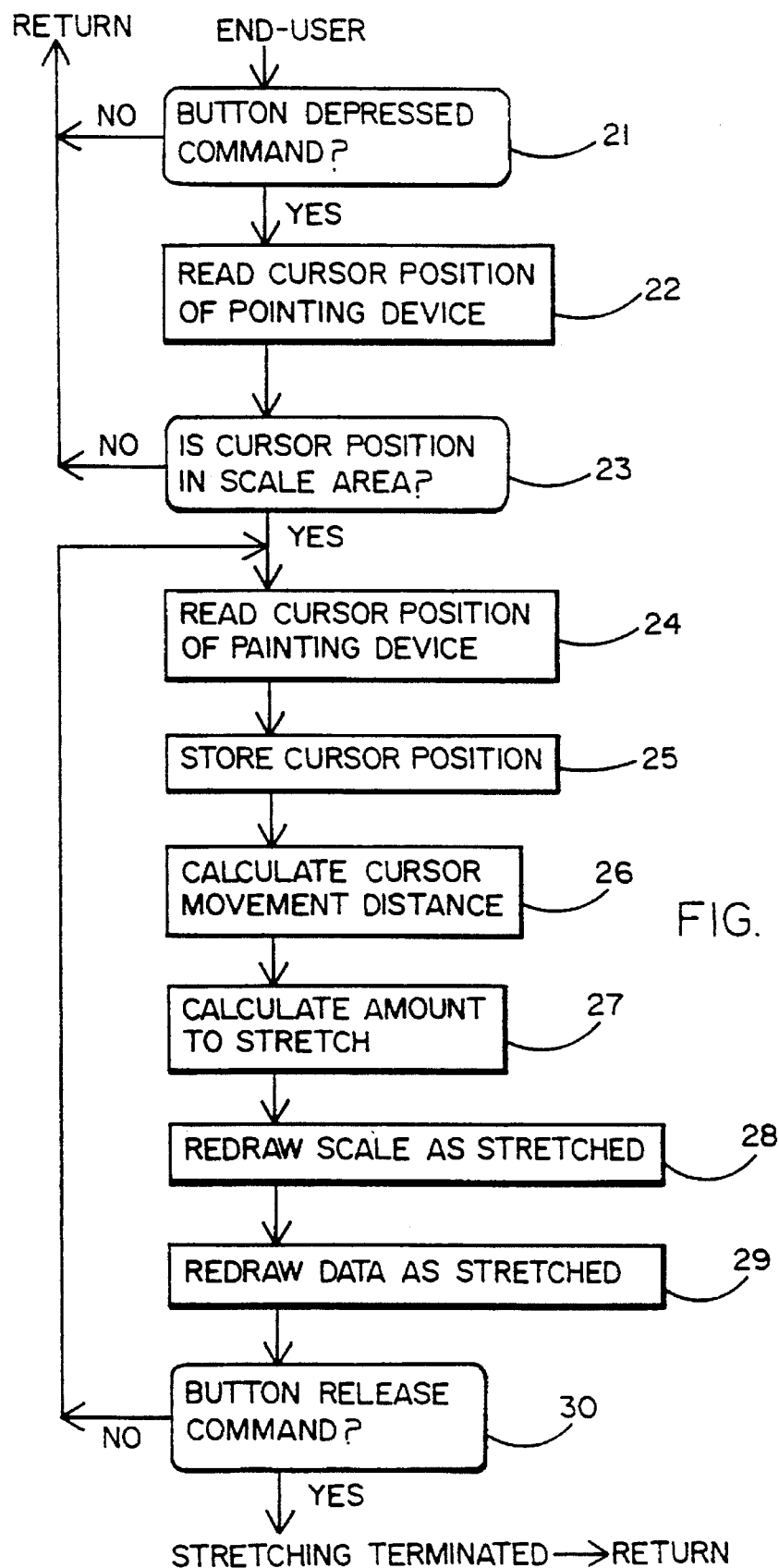
FIG. 3 is a flow chart illustrating one embodiment of the present invention.

Referring to FIG. 3, a flow chart of the method shows how the scale can be updated frequently while the data display is updated less frequently. The computer program recognizes a button depressed command 21 generated by the pointing device. Then, the computer program interrogates the pointing device to ascertain the cursor position 22 of the pointing device. The cursor position 22 from the pointing device may have been stored already by the computer program in a separate operation if the pointing device sends the cursor position 22 to the computer program on a frequent or continual basis.

If the cursor position 22 falls within the scale area 23 and a button is depressed 21, then a stretching operation is deemed to have been initiated. There may be a special scale area for stretching as opposed to other scale manipulation actions or the state of the scale might be set to a stretchable mode through an appropriate command sequence. Next, the cursor position 24 is read from the pointing device and saved 25. Then, the cursor position 24 is compared against the previously read cursor position and the difference taken to calculate the cursor movement distance 26. If the cursor movement distance 26 is a positive number, then the cursor has moved from the left to the right. If the cursor movement distance 26 is negative, the cursor has moved from the right to the left.

From the cursor movement distance 26, the amount to stretch 27 is calculated. This calculation may be simple or complex depending on the nature of the scale displayed and the data displayed relative to the scale. In some embodiments, the amount to stretch 27 may be identical to the cursor movement distance 26. In other embodiments, the amount to stretch 27 may be more than or less than the cursor movement distance 26.

After calculating the amount to stretch 27, the scale is redrawn 28 on the computer display screen. In the preferred embodiment, this gives immediate feedback to the end-user as to the current position of the scale and its width on the computer display screen.

Optionally, the data is displayed 29 in a new stretched position relative to the scale since the scale has now been stretched. Whether the data is displayed depends on the speed at which the computer can calculate the new screen position of the data and display the data in a timely enough fashion with respect to the rapidity of the movement of the pointing device. If the data displayed 29 is too complicated to render visually on the screen, the end-user may find the sluggish operation objectionable, and the step of displaying the data 29 may be omitted from the preferred embodiment.

Finally, the stretching operation is terminated when a button release command 30 is received from the computer pointing device or keyboard. This indicates that the end-user has terminated the stretching operation.

This process of reading the cursor position 24, saving the cursor position 25, calculating the cursor movement distance 26, and calculating the amount to stretch 27, redrawing the scale 28, and redrawing the data 29 is repeated for as long as the end-user moves the pointing device and until the end-user terminates the stretching operation. The end-user may repeat the entire process described above several times in succession in order to stretch beyond the portion of the scale shown on the computer display screen.

One skilled in the art will recognize that other forms of stretching can be implemented using the basic technique described above. One such method of stretching useful with the present invention is sliding stretching. In this embodiment, the program updates the scale by stretching the scale at a rate proportional to the position of a pointing device relative to a reference point. In this stretching mode, a special keystroke or mouse button combination together with the position of the pointing device is interpreted as an instruction to stretch left or right at a certain speed. For example, if the pointing device is slightly to the left of center of the appropriate scale reference point, the scale will stretch to the left, thus shrinking the displayed data. If the pointing device is positioned further away from the reference point, the same stretching action takes place at a more rapid rate. If the pointing device is at a maximum distance from the reference point, the scale will rapidly stretch. Similarly, if the pointing device is positioned to the right of the reference point the scale will stretch to the right, elongating the displayed data.

The rate of change is relative to the position of the pointing device in relation to the reference point. The rate of change of the scale versus the relative position of the pointing device and the reference point can be made linear, logarithmic, or of any other desired proportion. The rate of change should be set so that relatively small movements of the scale can be readily controlled to facility rapid and accurate stretching of the scale. Data can be displayed or updated once the scale has been stretched the desired amount.

One skilled in the art will recognize that additional extensions of this invention are possible. For example, the end-user could initiate a scaled stretching mode on a horizontal scale then move the pointing device to a vertical position which would be used to control the vertical scale simultaneously. In another mode, the reference for horizontal stretching would be a vertical line and the reference for vertical stretching would be a horizontal line, forming a Cartesian coordinate system. The position of the pointing device in two dimensions can then control the stretching in both the horizontal and vertical dimensions simultaneously. If a three-dimensional pointing device and display are available, this principle can be extended to three-dimensions. Another variation is a "ballistic" scale stretching operation wherein a mouse-click in a position at a moderate distance from the reference point causes the scale to begin to stretch in the indicated direction at a scaled rate, including "inertia," so the scale continues to stretch in the same direction until another command stops or modifies the stretching movement.

A general description of the method of using the present invention as well as a preferred embodiment of the present invention has been set forth above. One skilled in the art will recognize and be able to practice additional variations in the methods described which fall within the teachings of this invention.

What is claimed is:

1. A method for displaying on a computer display a selected portion of data, using a computer program running on a computer with means for displaying data and means for pointing to a selected point or region of the computer display, comprising:

providing a computer with a computer display, means for displaying data and means for pointing to a selected point or region of the computer display, said computer display comprising a data display region and a position indicia display region, providing a computer program which directs the means for displaying data to display a portion of data in the data display region, providing data which can be displayed at a magnification such that said data can not be displayed in its entirety within said data display region, displaying a first portion of said data in said data display region, providing and displaying position indicia means having a reference point in said position indicia display region, said position indicia means corresponding to a first portion of data displayed in said data region, where said position indicia means provides position information about the entire first portion of data, magnifying by a selected amount in a selected dimension the portion of data displayed in said data region to display a second portion of said data, said second portion of data including at least some of said first portion of data, said magnifying comprising displacing relative to said reference point by said selected amount in said selected dimension said means for pointing;

simultaneously expanding said position indicia means by said selected amount within said indicia display region independent of data in said data display region; and, subsequently stretching said data in said data display region by said selected amount.

2. The method of claim 1 wherein said data cannot be displayed in a single region of said display and the dam is selected from the group consisting of a document, a drawing, a table, a project schedule, and a chart.

3. The method of claim 1 wherein said computer display is a monitor.

4. The method of claim 1 wherein said position indicia means is a scale.

5. The method of claim 1 wherein said position indicia means is a ruler.

6. The method of claim 1 wherein said portion of data is updated in silhouette at least once while stretching the position indicia means.

7. The method of claim 1 wherein said portion of data displayed in said region is updated periodically but not continuously while said position indicia means is stretched.

8. The method of claim 1 wherein said stretching includes shrinking, which is negative stretching.

9. A method for use in an end-user-controlled interactive computer display system of stretching a multiscreen document such that a scale or ruler is stretched using a pointing device, and such that the scale is continuously redisplayed during stretching so that the end-user can see precisely where the stretched data will be positioned, including the steps of:

(a) displaying a scale within a scale display area of a computer program's display area;

(b) displaying data within a data display area of the computer program's display area underneath, adjacent to, or to the side of the scale display area such that displayed data is aligned with the scale;

(c) accepting the cursor position from a pointing device and determining whether the cursor's position is within the scale display area;

(d) accepting from a pointing device or computer keyboard a command to begin a stretching operation;

(e) accepting additional updates of the cursor position from a pointing device as the end-user moves the pointing device while the stretching operation is in progress;

(f) determining the distance to stretch based on the cursor's previous position and the cursor's present position;

(g) reversibly expanding said scale display within the scale display area based on the calculated distance to stretch;

(h) terminating said stretching operation responsive to an input signal from a pointing device or keyboard, and (i) displaying data in the data display area such that the displayed data has been stretched and is aligned with the scale's final position at the termination of the stretching operation of step (h).

10. The method of claim 9 further including during step (g) redisplaying the computer program's data display area in addition to redisplaying the scale such that the displayed dam has been stretched to match the new position of the scale and said data is aligned in its display with the scale.

11. The method of claim 9 wherein said stretching includes shrinking, which is negative stretching.

12. The method of claim 9 wherein said scale comprises a ruler, or similar demarcated visual device.

\* \* \* \* \*